Oct. 2, 1923.  
H. TRUST ET AL  
SHREDDING MACHINE  
Filed Dec. 16, 1919  
1,469,369

Inventor  
Henry Trust  
and  
By their Attorney Frank M. Ashley

Patented Oct. 2, 1923.

1,469,369

UNITED STATES PATENT OFFICE.

HENRY TRUST, OF PARK RIDGE, NEW JERSEY, AND FRANK M. ASHLEY, OF BROOKLYN, NEW YORK; SAID ASHLEY ASSIGNOR TO JOSEPHINE TRUST, OF PARK RIDGE, NEW JERSEY; JOSEPHINE TRUST ADMINISTRATRIX OF SAID HENRY TRUST, DECEASED.

SHREDDING MACHINE.

Application filed December 16, 1919. Serial No. 345,343.

*To all whom it may concern:*

Be it known that we, HENRY TRUST, a citizen of the United States, and resident of Park Ridge, in the county of Bergen and State of New Jersey, and FRANK M. ASHLEY, a citizen of the United States, and resident of Brooklyn, in the county of Kings and State of New York, have invented certain new and useful Improvements in Shredding Machines, of which the following is a specification.

Our invention relates to machines for shredding and comminuting food stuffs such as potatoes, carrots, cabbages, etc., and one object of our invention is to provide a machine comprising a removable disc having shredding teeth thereon. A further object is to provide a disc that can be stamped from thin sheets of metal and the teeth formed in the stamping operation. A further object is to provide a disc having radially extending corrugations having cutting blades formed in the upper surface of said corrugations. The corrugations permit the teeth to smoothly cut the vegetable without the tendency of bending the thin metal of the disc comprising said blades from their normal condition. The forming of the corrugations of the disc stiffens the disc and permits of the employment of a lighter spider than would otherwise be required.

Referring to the drawings which form a part of this specification:

Figure 1:
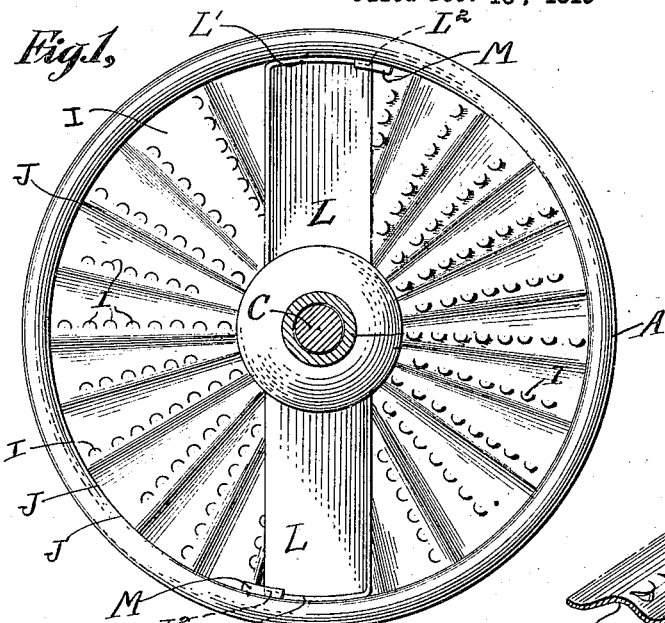
Figure 1 is a plan view of a receptacle and an illustrational view of the corrugations and teeth or cutters formed with the disc.
Figure 3:
Figure 3 is a perspective view of a portion of the disc.
Figure 2:
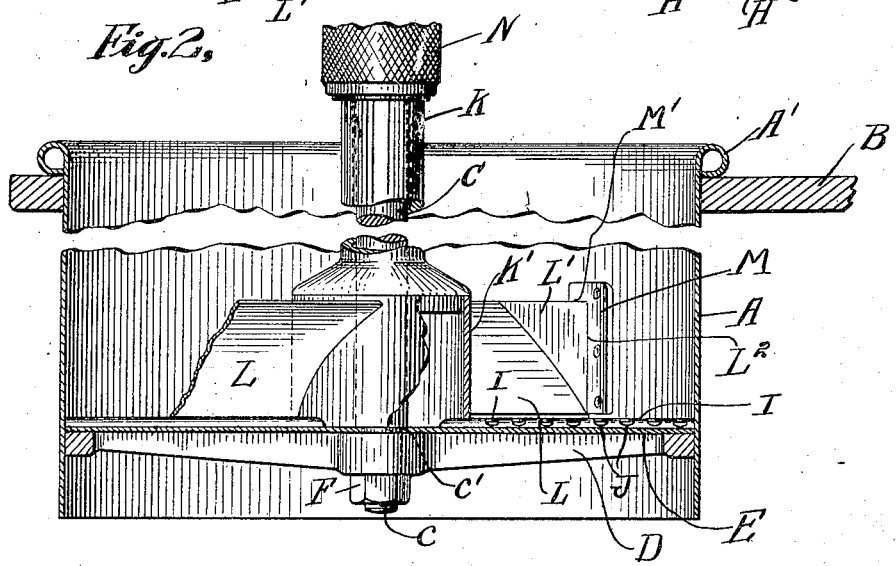
Figure 2 is a vertical sectional view further illustrating the construction.

A indicates a cylindrical receptacle which may be supported in a frame B from its beaded edge A'. C indicates a driving shaft, reduced at its lower end thus forming a shoulder C'. D indicates a spider, and E a disc, the disc and spider being clamped against the shoulder C' by the nut F which screws on the lower end of the shaft C and is rotated with the shaft. The disc E is provided with corrugations H—H etc., and the cutting edges located in the top of the corrugations as illustrated in Figure 3. The food, after cutting, passes through the openings J—J—J, etc., as will be readily understood. The raw potatoes or other such vegetables will be formed in strips of different shape depending on the form of the cutters and may thus give to the strips a fancy appearance when fried or otherwise provided. K indicates a tube the lower end of which is enlarged in diameter as shown at K' and the bottom end contacts with the disc E. Connected to and supported by the portion K' are inclined blades L—L respectively which extend to the sides of the receptacle A and are provided with flange portions L'—L' respectively which brace the blades, and the ends $L^2$ abut the strips M—M respectively which are riveted to the sides of the receptacle A. The upper ends of the blades are located under the edge of M'—M' respectively of the strips M to prevent the blades from lifting when in the position shown. N indicates a chuck which holds the shaft C but the tube K is not connected with, but may abut, the under side of said chuck if desired.

In operation, the raw materials such as potatoes are placed in the receptacle A and the shaft C rotated, carrying the potatoes under the inclined faces of the blades, thus forcing them against the cutters which cut and pass the strips through the openings J—J, etc., from which they fall into a receptacle placed below the receptacle A.

Having thus described our invention, we claim as new and desire to secure by Letters Patent:

1. A disk cutter comprising a thin sheet of metal adapted to be carried on a rotating spindle and having corrugations extending radially relative to its centre and cutting blades formed in the upper surface of said corrugations and integral with said disk.

2. A disk cutter comprising a thin sheet of metal adapted to be carried on a rotating spindle and having corrugations extending radially relative to its centre and cutting blades formed in the upper surface of said corrugations and integral with said disk and arranged in spiral formation.

3. A disk cutter comprising a thin sheet of metal adapted to be carried on a rotating spindle and having corrugations extending radially relative to its centre and cutting blades formed in the upper surface of said corrugations and integral with said disk, the edges of which extend substantially in a horizontal plane and having openings extending through said corrugations below said cutters.

Signed at New York city, in the county of New York and State of New York, this 9th day of December A. D. 1919.

HENRY TRUST.
FRANK M. ASHLEY.